(12) United States Patent
Benoit (10) Patent No.: US 12,339,029 B2
(45) Date of Patent: Jun. 24, 2025

(54) EXPANDABLE PLENUM FLANGE AND METHOD OF USE

(71) Applicant: Christopher Henry Benoit, Vinton, LA (US)

(72) Inventor: Christopher Henry Benoit, Vinton, LA (US)

( * ) Notice: Subject to any disclaimer, the term of this patent is extended or adjusted under 35 U.S.C. 154(b) by 244 days.

(21) Appl. No.: 17/816,212

(22) Filed: Jul. 29, 2022

(65) Prior Publication Data

US 2024/0035700 A1    Feb. 1, 2024

(51) Int. Cl.
*F24F 13/02* (2006.01)
*F16L 41/08* (2006.01)

(52) U.S. Cl.
CPC .......... *F24F 13/0209* (2013.01); *F16L 41/08* (2013.01)

(58) Field of Classification Search
CPC ... F24F 13/0209; F24F 13/0245; F16L 41/08; F16L 9/17; F16L 33/12; F16L 55/163; F16L 37/20; B65D 45/345
See application file for complete search history.

(56) References Cited

U.S. PATENT DOCUMENTS

| 627,987 | A | * | 7/1899 | Dick | F16L 33/12 |
| | | | | | 24/270 |
| 2,303,927 | A | * | 12/1942 | Eogg | F16L 33/12 |
| | | | | | 285/239 |
| 2,482,558 | A | * | 9/1949 | Scaringella | F16L 27/0849 |
| | | | | | 403/57 |
| 2,880,017 | A | | 3/1959 | Anderson | |
| 2,935,340 | A | | 5/1960 | St. Marie | |
| 2,950,131 | A | | 8/1960 | Hennen | |
| 3,261,632 | A | * | 7/1966 | Schaefer | B65D 45/345 |
| | | | | | 292/256.69 |
| 4,123,093 | A | | 10/1978 | Newland | |
| 4,344,719 | A | | 8/1982 | Thom | |
| 4,418,943 | A | | 12/1983 | Ionna | |
| 4,765,033 | A | | 8/1988 | Hollingsworth | |
| 4,969,923 | A | | 11/1990 | Reeder et al. | |
| 5,333,360 | A | | 8/1994 | Detiker | |
| 5,382,113 | A | * | 1/1995 | Chilton | E02D 29/12 |
| | | | | | 404/25 |

(Continued)

FOREIGN PATENT DOCUMENTS

| EP | 0394127 B1 | 12/1994 |
| WO | WO2019169537 A1 | 9/2019 |

OTHER PUBLICATIONS

"Clamp Together Duct System", US Duct, us-duct.com, [Document Modified:Jun. 20, 2017 1:27:56 PM] https://www.us-duct.com/sites/default/files/resources/2020/Clamp-together-duct-spec-parts-brochure-US-Duct.pdf.

(Continued)

*Primary Examiner* — Zachary T Dragicevich
*Assistant Examiner* — Alexander T Rufrano
(74) *Attorney, Agent, or Firm* — Schultz & Associates, P.C.

(57) ABSTRACT

An expandable plenum flange for a heating ventilating and air conditioning system is provided. The flange includes a toggle mechanism positioned on its exterior surface. The toggle mechanism provides a multi-jointed closure having an open position and a closed position. The open position contracts the diameter and circumference of the flange. The closed position expands the circumference and diameter of the flange thereby sealing it in a plenum hole.

6 Claims, 10 Drawing Sheets

(56) References Cited

U.S. PATENT DOCUMENTS

| | | | |
|---|---|---|---|
| 5,518,277 A | 5/1996 | Sanders | |
| 5,738,359 A | 4/1998 | Gundy | |
| 6,244,633 B1 * | 6/2001 | Warren | F16L 37/008 285/141.1 |
| 6,955,498 B1 | 10/2005 | McCuan et al. | |
| 7,216,898 B1 | 5/2007 | Hermanson | |
| 7,243,956 B2 | 7/2007 | Brockway | |
| 8,720,907 B2 | 5/2014 | Worley | |
| 9,644,768 B2 | 5/2017 | Skinner et al. | |
| 10,012,333 B2 | 7/2018 | Sandman et al. | |
| 11,015,754 B2 | 5/2021 | Capriotti | |
| D925,345 S | 7/2021 | Slocum et al. | |
| 2001/0026048 A1 * | 10/2001 | Proctor | F16L 21/08 277/603 |
| 2004/0012201 A1 | 1/2004 | Bartholoma et al. | |
| 2007/0234568 A1 | 10/2007 | Knoblauch | |
| 2011/0074116 A1 | 3/2011 | Neuhaus et al. | |

OTHER PUBLICATIONS

"Inside Pipe Repair—Expansion Clamp", Westatlantic Tech Corp-,pipelinecoupling.com, Aug. 10, 2015 https://web.archive.org/web/20150810080459/https://www.pipelinecoupling.com/pages2/expanding-inside-pipe-repair-clamps.php.

"QF Duct Clamp", NORDFAB, qfduct.com, Nov. 27, 2020 https://web.archive.org/web/20201127055012/https://qfduct.com/qf-clamp.html.

* cited by examiner

EXPANDABLE PLENUM FLANGE AND METHOD OF USE

FIELD OF THE INVENTION

The present invention relates to flanges in residential heating ventilating and air conditioning ("HVAC") duct systems.

BACKGROUND OF THE INVENTION

Figure 1:
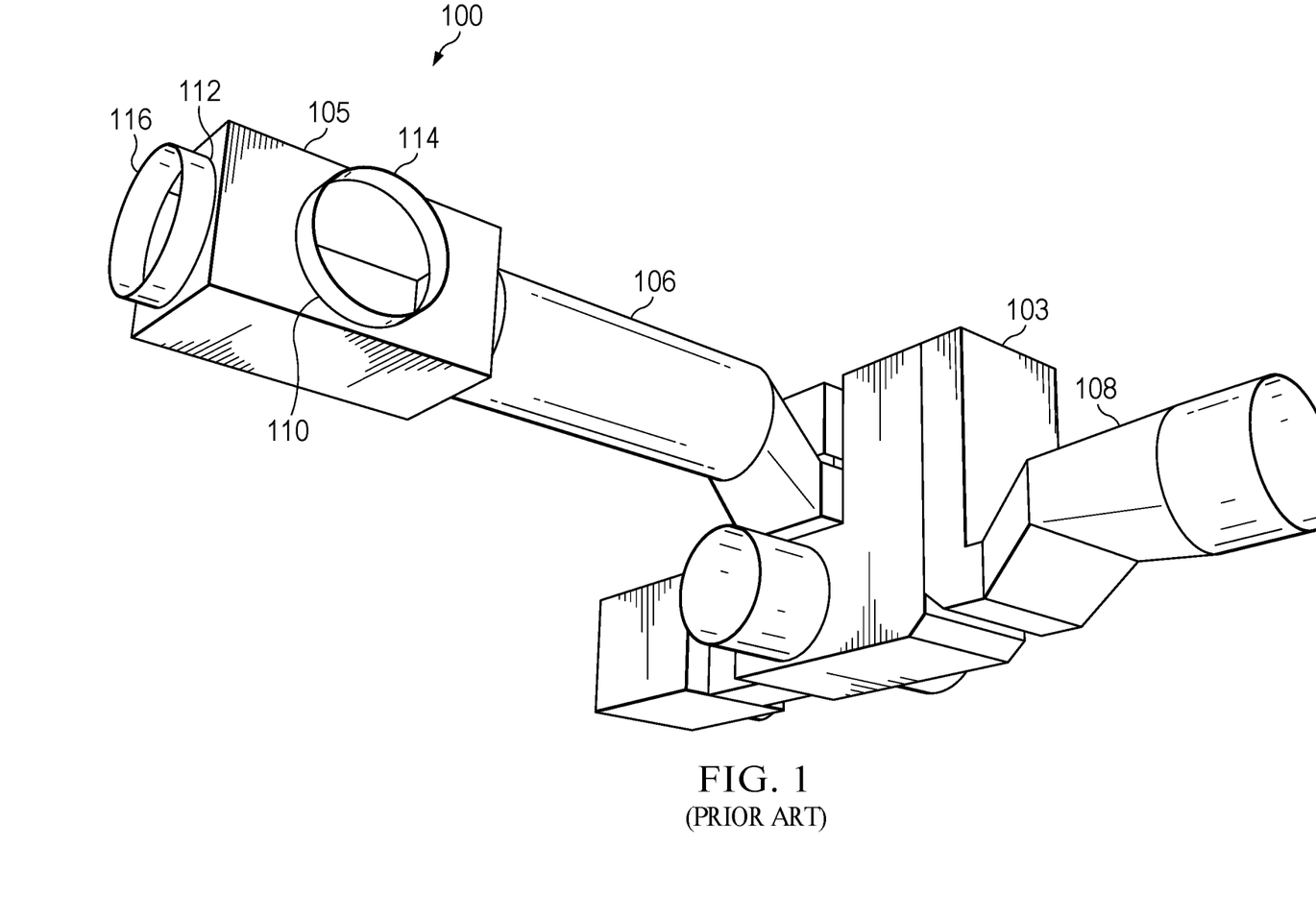
FIG. 1 shows an isometric view of an exemplary prior art HVAC duct installation.

Referring to FIG. 1, in common residential HVAC installations a plenum is usually required to distribute heating or cooling air to various locations. Typically, the plenum is connected to various runs connected to corresponding flanges. The flanges are installed in holes in the plenum and are sealed to prevent air leakage and promote energy efficiency.

Example HVAC ducting installation 100 includes plenums 103 and 105. Plenum 103 is connected to run 106 and run 108. Plenum 105 includes holes 110 and hole 112. Flange 114 is installed in hole 110. Flange 116 is installed in hole 112.

Figure 2:
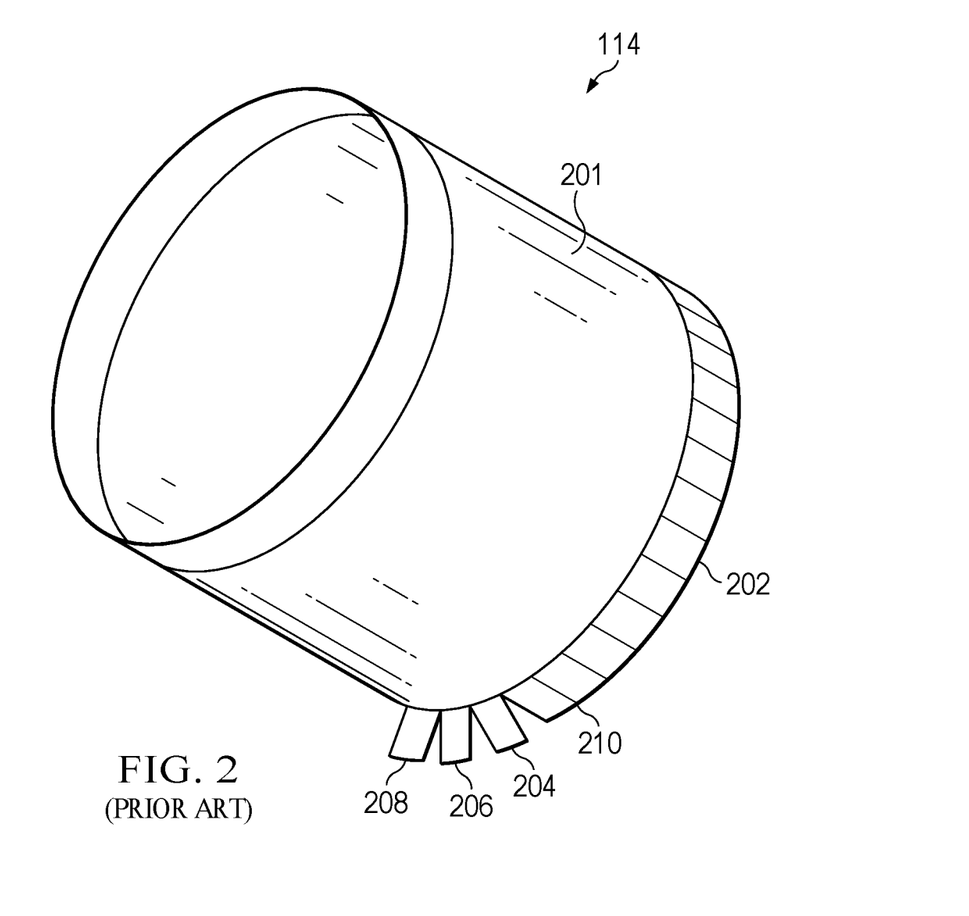
FIG. 2 shows an isometric view of an exemplary prior art flange.

The flanges of the prior art are typically held in place in the plenum holes by a plurality of radial tabs. Referring to FIG. 2, flange 114, by way of example, is formed from continuous cylinder 201 made of sheet metal. The continuous cylinder includes a number of longitudinal tabs 202. The tabs are formed by a number of divisions 210, which allow each tab to be individually bent outward or inward as required during installation. In this example, longitudinal tabs 204, 206 and 208 are shown bent outward as would be appear inside the plenum after installation.

The prior art of flange installation has problems. For instance, bending the tabs outward during installation creates a dangerous condition for the installer due to the sharp edges of the tabs. Injuries often occur.

Another problem is repositioning the flange after installation. Repositioning is difficult because the tabs are inside the plenum. Once other duct work is attached to the plenum flange, the tabs become inaccessible.

The prior art has attempted many times to solve the problems of flange installation, but all have fallen short.

U.S. Pat. No. 6,244,633 to Warren discloses a collar collapsed and inserted in a hole on the wall of a plenum. The collar is then expanded using a special tool. A securing tab is ratcheted across slots which provide a locking mechanism for holding the collar in the expanded state.

U.S. Pat. No. 2,880,017 to Anderson, et. al., discloses a way to connect ducting to a plenum chamber. Anderson discloses a resilient collar, which moves between a collapsed position and an expanded position. A plate is connected inside the collar between two edges of the collar, which provides a locking action when pressed outwardly.

U.S. Pat. No. 2,935,340 to St. Marie discloses a metal band positioned inside a conduit between opposing edges. The band is hinged to both sides and used to expand the conduit outwardly to seal against a plenum chamber.

U.S. Pat. No. 6,955,498 to McCuan, et al. discloses a closure device positioned inside a circular conduit. The closure includes an outer band and inner band. A clamp is attached to the inner band and the outer band which expands the inner band against the outer band to seal the conduit.

U.S. Pat. No. 4,418,943 to Ionna discloses a duct fitting provided with an attachment. The attachment includes a ring fixed to the fitting, and an expandable collar connected to the ring. A bead on the ring bead and a flange on the collar cooperate to retain the collar in the fitting so that the collar may be adjusted depending on how the fitting is connected.

SUMMARY OF THE INVENTION

The invention provides a laterally disposed toggle mechanism positioned on the exterior surface of a cylindrical flange for an HVAC plenum chamber. The toggle mechanism provides a connection between opposing edges of the cylindrical flange. In an open position the toggle mechanism decreases the diameter and circumference of the flange so that it may be positioned and repositioned within a plenum hole. In a closed position, the toggle mechanism expands the diameter and circumference of the flange thereby fixing it in the plenum hole. The position of the toggle mechanism on the exterior of the flange allows it to be repositioned easily after installation of the duct work. Further, the position of the toggle mechanism on the exterior of the flange reduces the potential for injury which is present in the prior art.

BRIEF DESCRIPTION OF THE DRAWINGS

In the detailed description of the preferred embodiments presented below, reference is made to the accompanying drawings.

DETAILED DESCRIPTION OF THE INVENTION

In the description that follows, like parts are marked throughout the specification and figures with the same numerals, respectively. The figures are not necessarily drawn to scale and may be shown in exaggerated or generalized form in the interest of clarity. Unless otherwise specified, all tolerances and usages of the term "about" indicate ±20%.

Figure 3:
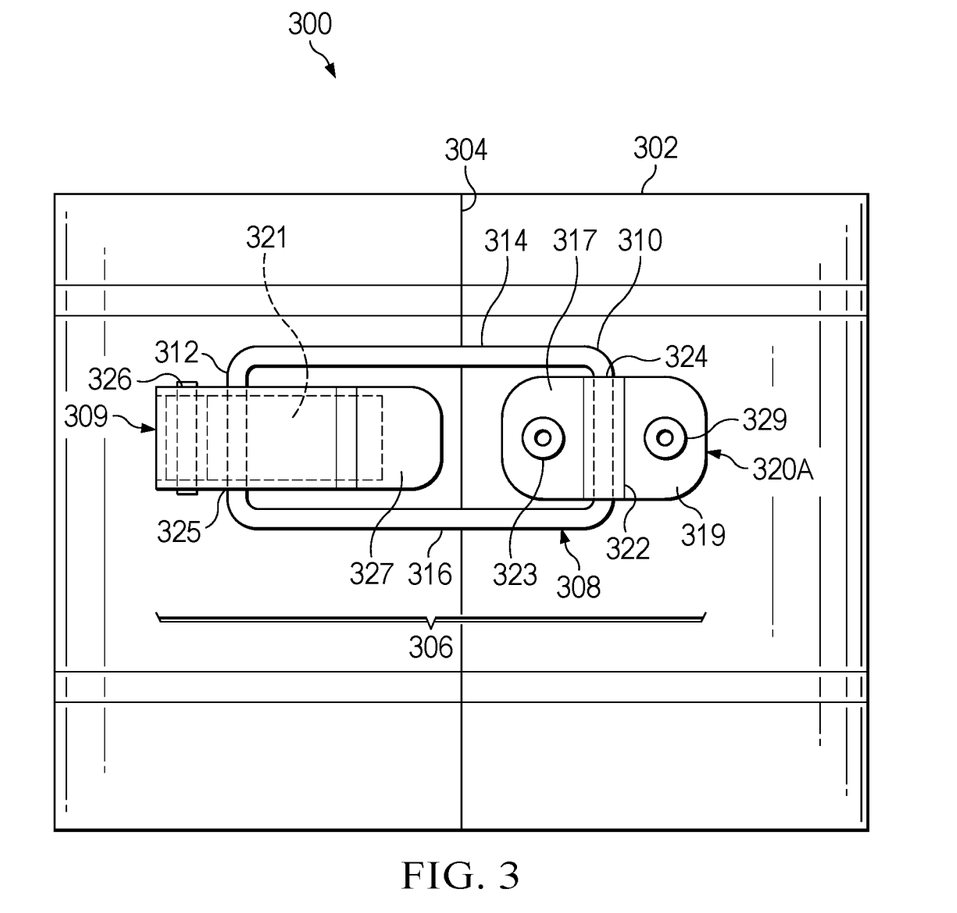
FIG. 3 shows a side view of a preferred embodiment of an expandable flange.
Figure 4:
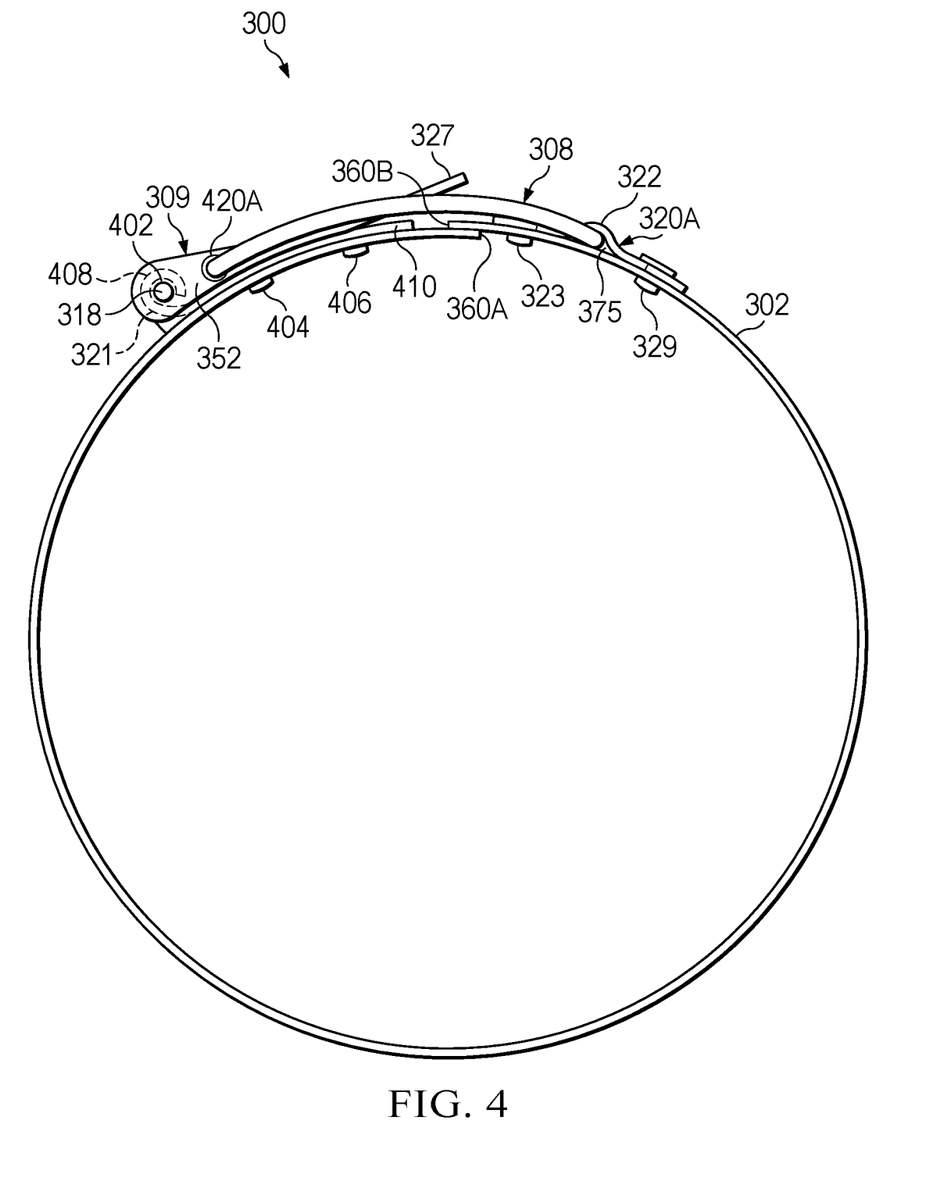
FIG. 4 shows a bottom view of a preferred embodiment of an expandable flange.
Figure 5:
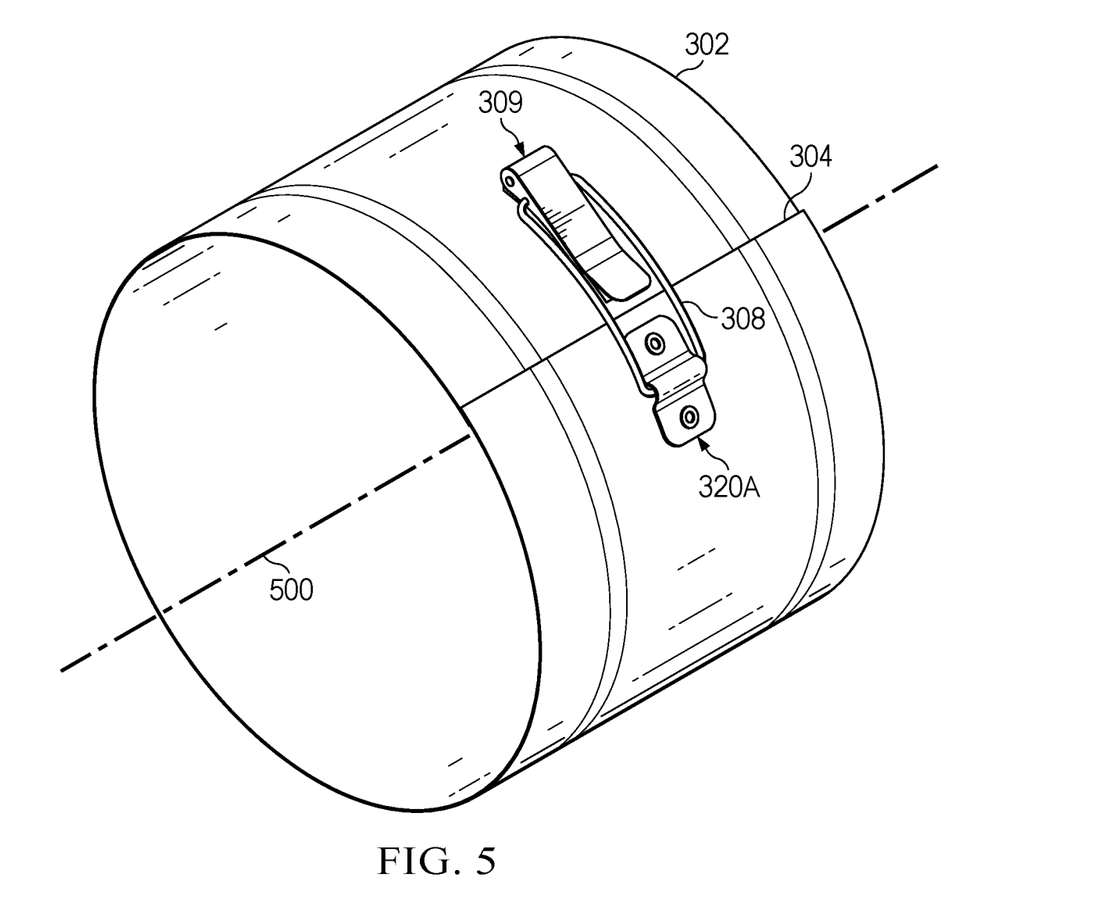
FIG. 5 shows an isometric view of a preferred embodiment of an expandable flange.

Referring to FIGS. 3, 4 and 5, expandable flange 300, will be further described.

Expandable flange 300 includes cylindrical housing 302. Cylindrical housing 302 includes generally parallel longitudinal edges 360A and 360B separated by longitudinal partition 304. In a preferred embodiment, cylindrical housing 302 is formed from 30-gauge aluminum sheet metal.

However, other thicknesses and materials will suffice, such as 20-gauge stainless steel or tin. Longitudinal partition 304 extends for the length of the cylindrical housing and allows the circumference and diameter of the cylindrical housing to expand and contract.

Edge 360A and edge 360B are connected by toggle mechanism 306. The toggle mechanism is positioned on the exterior of the cylindrical housing, generally laterally to central axis 500 and conforming to the rounded exterior of the cylindrical housing. The position of the toggle on the exterior of the cylindrical housing is important because it allows the toggle mechanism to be accessed after the plenum and ductwork are in place. This is a distinct advantage over the prior art because it allows repositioning of the flange after the ductwork is complete, which is prohibited by the internally positioned mechanisms of the past.

Toggle mechanism 306 includes shackle 321 and shackle 320A, connected by link 308 and lever 309 at joints 324, 325 and 326. Link 308 is generally rectangular in shape, formed by pin 312, bar 314, pin 310, and bar 316. Bar 314 and bar 316 are both semi-circular in shape and generally follow the exterior contour of the cylindrical housing. In a preferred embodiment, link 308 is formed from a loop of 8-gauge stainless steel wire, having a single weld closure.

Shackle 320A is further comprised of plate 317 and plate 319 connected by arch 322. Arch 322 and the cylindrical housing form longitudinal cavity 375. Rivet 323 and rivet 329 rigidly affix shackle 320A to cylindrical housing 302. Shackle 320A is preferably formed from 20-gauge stainless steel sheet. Pin 310 of link 308 fits within longitudinal cavity 375 and is constrained to pivotal motion, thereby forming joint 324, as will be further described.

Shackle 321 is further comprised of plate 410 integrally formed with curl 408. Curl 408 is generally formed in the shape of a cylinder, including longitudinal cavity 402. Plate 410 is rigidly fixed on cylindrical housing 302 by rivet 404 and rivet 406.

Figure 6:
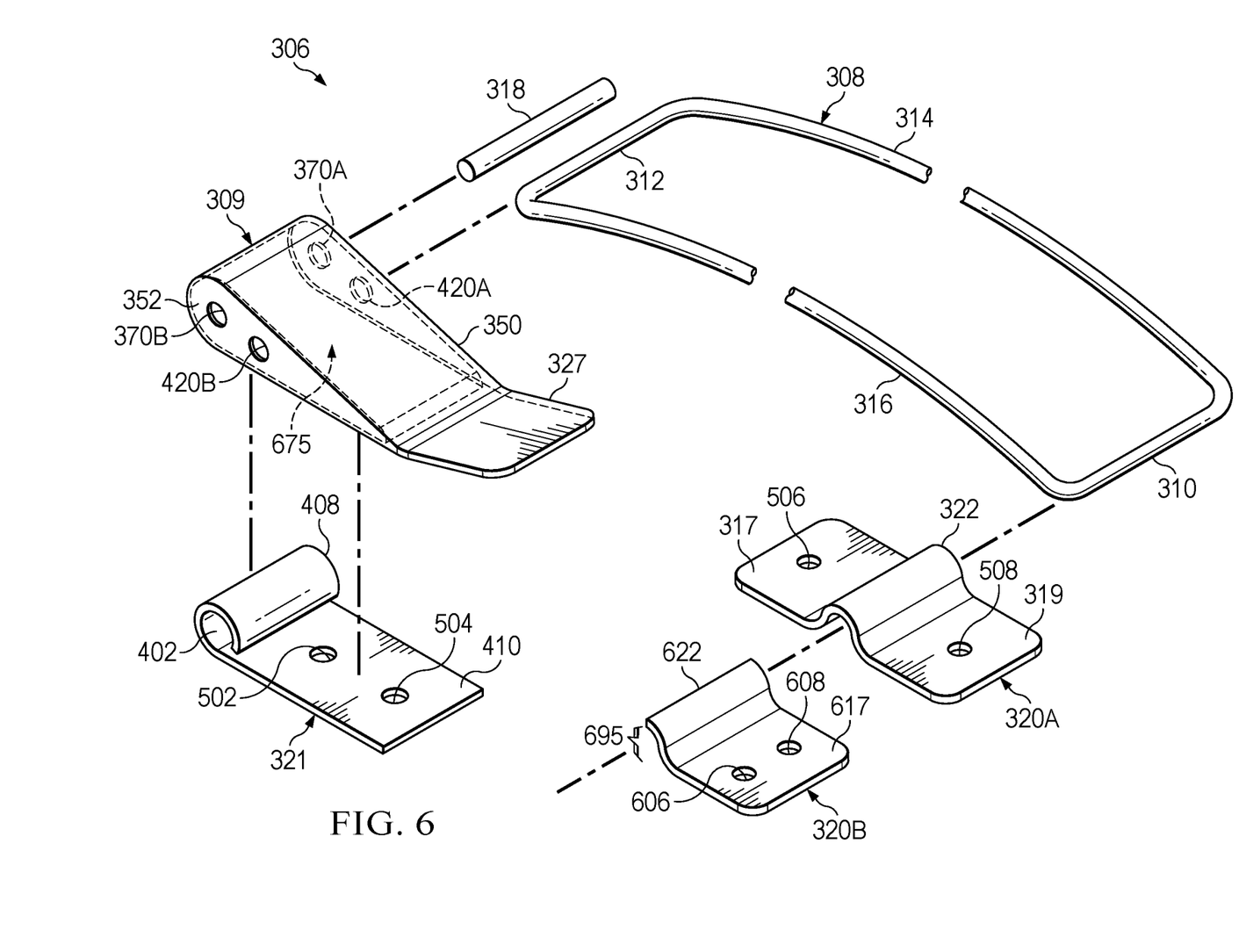
FIG. 6 shows an exploded isometric view of a preferred toggle mechanism.

Referring to FIG. 6, lever 309 is further comprised of lever handle 327. Lever handle 327 is integrally formed with downward flange 350 and downward flange 352. Downward flange 350 and downward flange 352 form lateral connection cavity 675. Lever 309 is preferably formed of 10-gauge stainless steel.

Hole 420A is positioned in downward flange 350. Hole 420B is positioned in downward flange 352. Hole 420A is collinear with hole 420B. Pin 312 of link 308 is positioned in holes 420A and 420B, and is constrained to pivotal motion, thereby forming joint 325, as will be further described.

Likewise, hole 370A is formed in downward flange 350. Hole 370B is formed in downward flange 352. Hole 370A is collinear with hole 370B. Pin 318 is positioned through hole 370A, longitudinal cavity 402, and hole 370B, within longitudinal cavity 402 and is constrained to pivotal motion, thereby forming joint 326, as will be further described.

Shackle 320A further comprises holes 506 and 508. Rivet 323 is positioned through hole 506 and through cylindrical housing 302. Likewise, rivet 329 is positioned through hole 508 and through cylindrical housing 302.

Plate 410 includes hole 502 and hole 504. Rivet 406 is positioned in hole 504 and through cylindrical housing 302. Likewise, rivet 404 is positioned through hole 502 and through the cylindrical housing.

As shown best in FIG. 6, shackle 320A may be replaced, alternatively with shackle 320B. Shackle 320B is comprised of plate 617 connected to arch 622. Arch 622 forms longitudinal cavity 695 with the cylindrical housing. In this embodiment, the longitudinal cavity is open ended. Rivets (not shown) rigidly secure shackle 320B to the cylindrical housing through hole 606 and hole 608. Pin 310 can be removably positioned within longitudinal cavity 695. The pin exerts a force away from shackle 321 when the toggle mechanism is in the closed position. However, the pin may be removed from longitudinal cavity 695 when the toggle mechanism is in the open position and so exerts no force on shackle 320B.

Figure 7:
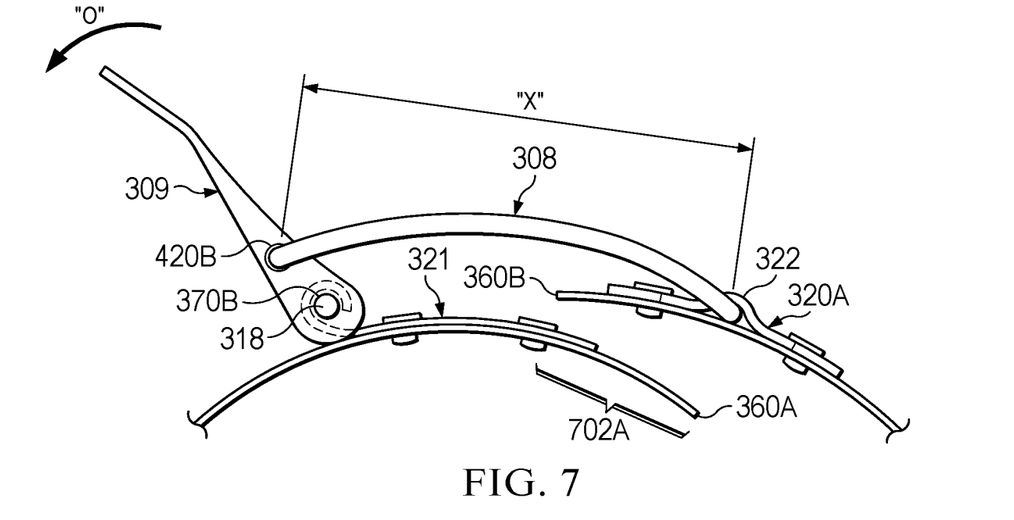
FIG. 7 shows a partial bottom view of a preferred embodiment of an expanded flange in an open position.
Figure 8:
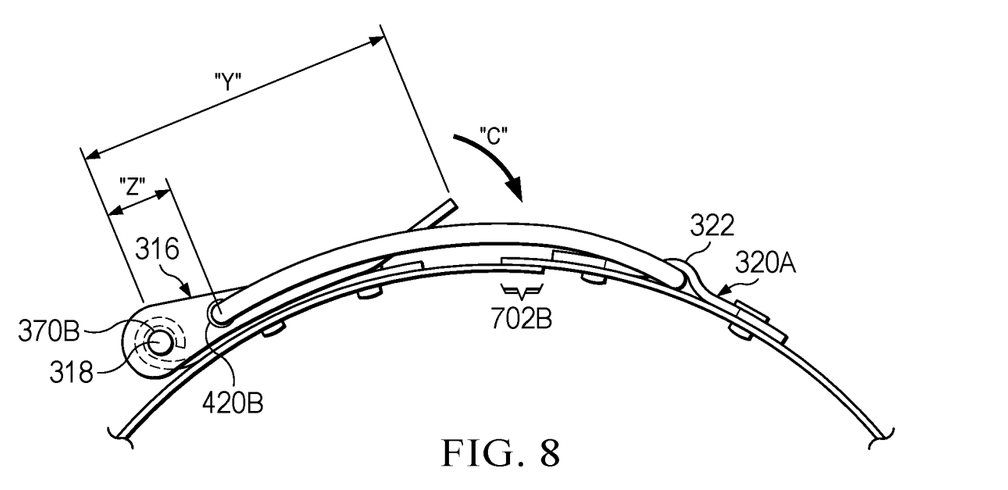
FIG. 8 shows a partial bottom view of a preferred embodiment of an expandable flange in a closed position.

Referring then to FIGS. 6, 7 and 8, the operation of expandable flange 300 will be further described.

In a preferred embodiment, the linear distance between the longitudinal axis of pin 312 and the longitudinal axis of pin 310, "x", is approximately four inches. Likewise, the distance between the longitudinal axis of hole 370B and the distal end of lever handle 327, "y", is approximately two inches. The distance between the longitudinal axis of hole 370B and the longitudinal axis of hole 420B, "z", is approximately ½ inch. Likewise, the nominal diameter of cylindrical housing 302 is approximately eight inches. It should be understood that these dimensions are examples only. The dimensions may be changed to accommodate different flanges and different duct systems.

To move expandable flange 300 to its open position, lever 309 is rotated in a counterclockwise direction, "o", about pin 318 increasing overlap 702A between edge 360A and edge 360B, thereby contracting the diameter and circumference of the cylindrical housing.

To move the expandable flange to its closed position, lever 309 is moved in a clockwise direction, "c", decreasing overlap 702B between edge 360A and edge 360B thereby expanding the circumference and diameter of the cylindrical housing and bringing edge 360A into contact with edge 360B to create an airtight seal between them.

In a preferred embodiment, the circumference of the cylindrical housing is expanded between the open position and the closed position according to the following equation:

$$\Delta C = 2z$$

Where:
$\Delta C$=change in circumference; and,
z=distance between the axis of hole 370B and the axis of hole 420B.

In a preferred embodiment, the diameter of the cylindrical housing is expanded between the open position and the closed position according to the following equation:

$$\Delta D = \frac{2z}{\pi}$$

Where:
$\Delta D$=change in diameter; and,
z=distance between the axis of hole 370B and the axis of hole 420B.

Figure 9:
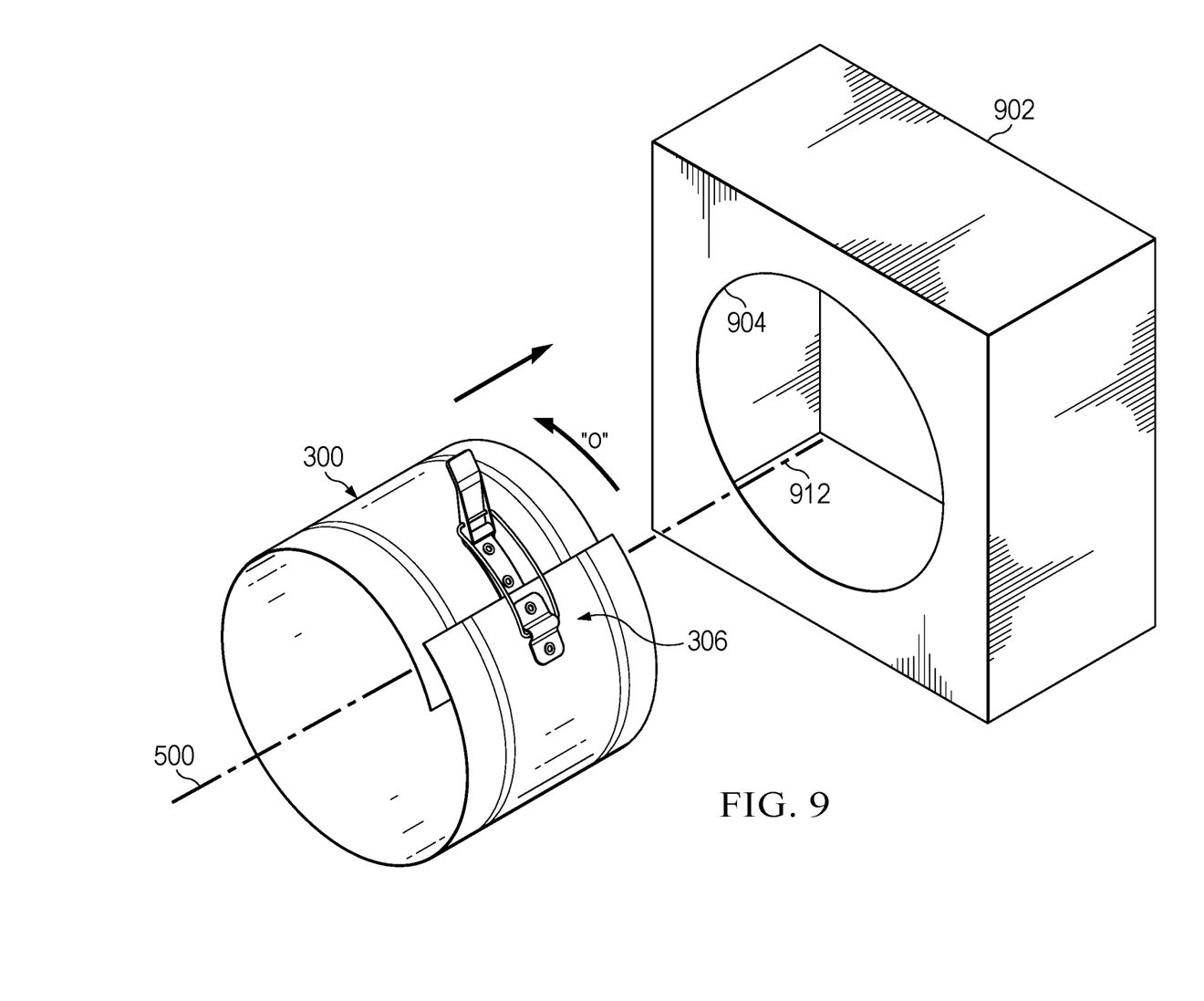
FIG. 9 shows an isometric view of a preferred embodiment of an expandable flange, in an open position, prior to installation.
Figure 10:
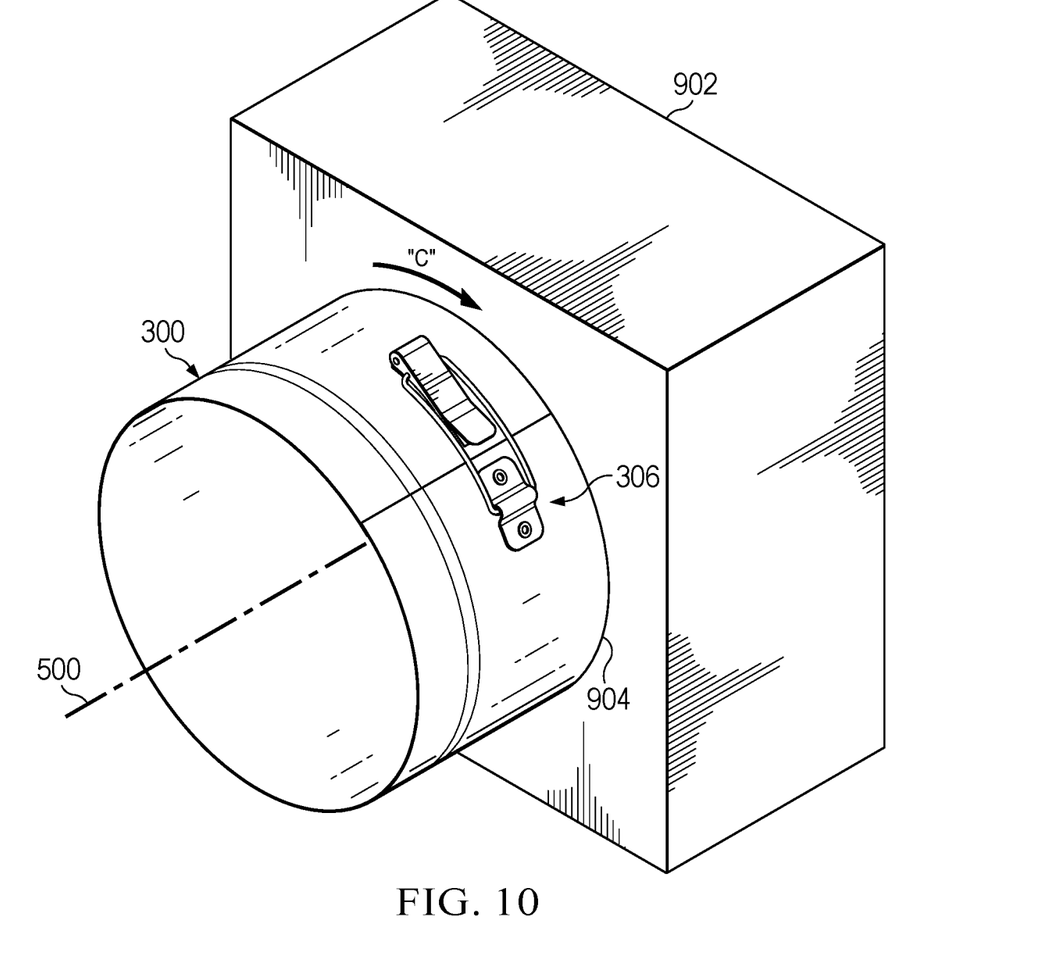
FIG. 10 shows a isometric view of a preferred embodiment of an expandable flange in a closed position, installed in a plenum.
Figure 11:
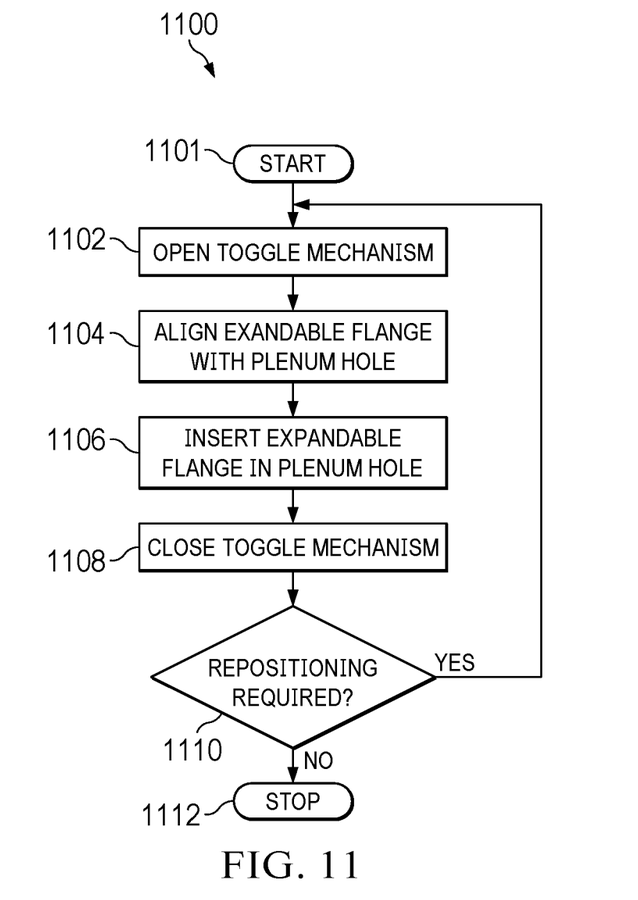
FIG. 11 shows a flowchart of the steps of a preferred method of installation of the expandable flange.

Referring then to FIGS. 9, 10 and 11, method of use 1100 of the expandable flange shall be further described.

At step 1101, the method begins.

At step 1102, lever 309 is moved counterclockwise in direction "o" placing toggle mechanism 306 in its open position, thereby allowing reduction of the circumference and diameter of the cylindrical housing so that the edges overlap but do not engage.

At step 1104, axis 500 of expandable flange 300 is aligned with axis 912 of plenum hole 904 of exemplary plenum 902.

At step 1106, the expandable flange is moved coaxially along its central axis and the axis of the plenum hole, into plenum hole 904.

At step 1108, lever 309 is moved clockwise in direction "c" placing toggle mechanism 306 in its closed position thereby expanding the circumference and diameter of the cylindrical housing so that the edges engage to form a sealed closure fixed in plenum hole 904.

At step 1110, the position of the expandable flange is evaluated to determine whether or not it requires repositioning. If so, the method returns to step 1102. If not, the method proceeds to step 1112.

At step 1112, the method concludes.

The invention claimed is:

1. A method of installing an expandable plenum flange in a plenum hole comprising:
    providing a cylindrical housing, having an interior surface and an exterior surface;
    providing the cylindrical housing with a variable diameter;
    providing a first shackle, fixed to the exterior surface;
    providing a closed link, constrained by the first shackle;
    providing a toggle lever, having an open position and a closed position, pivotally connected to the closed link,
    providing a second shackle, fixed to the exterior surface, pivotally connected to the toggle lever;
    moving the toggle lever to the open position whereby the variable diameter is decreased;
    aligning the expandable plenum flange with the plenum hole;
    inserting the expandable plenum flange in the plenum hole;
    moving the toggle lever to the closed position whereby the variable diameter is increased and the expandable plenum flange is fixed in the plenum hole;
    moving the toggle lever back to the open position;
    realigning the expandable plenum flange with the plenum hole;
    reinserting the expandable plenum flange in the plenum hole;
    moving the toggle lever back to the closed position;
    providing the cylindrical housing with a first edge and a second edge separated by a longitudinal partition;
    wherein the first edge is in sealed contact with the second edge in the closed position;
    providing the first shackle with a ridged arch, adjacent the exterior surface, forming a first longitudinal cavity;
    providing the closed link with a first pin and a second pin;
    connecting the first pin and the second pin by a first semicircular bar and a second semicircular bar; and
    providing a first joint by placing the first pin in the first longitudinal cavity.

2. The method of claim 1, further comprising:
    removing the first pin from the first longitudinal cavity.

3. The method of claim 1, further comprising:
    providing with a lateral connection cavity; and
    providing the second shackle further with a curl, forming a second longitudinal cavity, operably disposed in the lateral connection cavity.

4. The method of claim 3, further comprising:
    providing the lateral connection cavity with a first pair of colinear holes; and
    connecting a third pin between the first pair of collinear holes and the second longitudinal cavity to form a second joint.

5. The method of claim 4, further comprising:
    providing the lateral connection cavity with a second pair of colinear holes, parallel with the first pair of colinear holes; and
    providing the second pin in the second pair of colinear holes.

6. The method of claim 5, further comprising:
    providing the first pin, the second pin, and the third pin in a parallel arrangement with the first edge and the second edge.

* * * * *